United States Patent
Nagaraj et al.

[11] Patent Number: 5,427,866
[45] Date of Patent: Jun. 27, 1995

[54] PLATINUM, RHODIUM, OR PALLADIUM PROTECTIVE COATINGS IN THERMAL BARRIER COATING SYSTEMS

[75] Inventors: Bangalore A. Nagaraj, W. Chester, Ohio; William B. Connor, Clifton Park, N.Y.; Richard W. Jendrix, Cincinnati, Ohio; David J. Wortman, Hamilton, Ohio; Larry W. Plemmons, Fairfield, Ohio

[73] Assignee: General Electric Company, Cincinnati, Ohio

[21] Appl. No.: 218,167

[22] Filed: Mar. 28, 1994

[51] Int. Cl.⁶ .......................... B32B 15/04; B63H 1/26
[52] U.S. Cl. ...................... 428/610; 428/670; 428/678; 428/629; 428/633; 416/241 R; 416/241 B
[58] Field of Search .............. 428/633, 670, 678, 629, 428/632, 610; 416/241 R, 241 B

[56] References Cited

U.S. PATENT DOCUMENTS

| | | | |
|---|---|---|---|
| 3,677,789 | 7/1972 | Jngardt et al. | 428/670 |
| 3,692,554 | 9/1972 | Bungardt et al. | 428/680 |
| 3,819,338 | 6/1974 | Bungardt et al. | 428/678 |
| 3,961,910 | 6/1976 | Baladjanian et al. | 428/678 |
| 3,979,273 | 9/1976 | Panzera et al. | 428/678 |
| 3,999,956 | 12/1976 | Stueber et al. | 428/670 |
| 4,123,595 | 10/1978 | Chang | 428/667 |
| 4,137,370 | 1/1979 | Fujishiro et al. | 428/660 |
| 4,321,310 | 3/1982 | Ulion et al. | 428/678 |
| 4,399,199 | 8/1983 | McGill et al. | 428/633 |
| 4,477,538 | 10/1984 | Clarke | 428/656 |
| 4,530,885 | 7/1985 | Restall | 428/670 |
| 4,880,614 | 11/1989 | Strangman et al. | 428/633 |
| 5,180,285 | 1/1993 | Lau | 428/633 |
| 5,236,745 | 8/1993 | Gupta et al. | 428/633 |
| 5,238,752 | 8/1993 | Duderstadt et al. | 428/633 |

OTHER PUBLICATIONS

Birks et al, "Introduction to High Temperature Oxidation of Metals" 1983 (no month), p. 128.
"Field Evaluation of Gas Turbine Protective Coatings"—A. McMinn, Transactions of the ASME, p. 142/vol. 110, Jan. 1988.

Primary Examiner—Michael Lewis
Assistant Examiner—N. M. Nguyen
Attorney, Agent, or Firm—Andrew C. Hess; David L. Narciso

[57] ABSTRACT

A coated article comprises a base article having a substrate made of a material selected from the group consisting of a nickel-base alloy and a cobalt-base alloy, an intermediate metallic coating structure, and a thermal barrier coating. The intermediate metallic coating structure may be a protective layer of platinum, rhodium, or palladium on the base article, with no bond coat. The intermediate metallic coating may also be a bond coat, either oxidized or unoxidized, with a protective layer of platinum, rhodium, or palladium thereon. The protective layer typically partially interdiffuses with the underlying metallic structure.

9 Claims, 1 Drawing Sheet

PLATINUM, RHODIUM, OR PALLADIUM PROTECTIVE COATINGS IN THERMAL BARRIER COATING SYSTEMS

BACKGROUND OF THE INVENTION

The Government has rights in this invention pursuant to Contract F33657-83-C-0281 awarded by the Department of the Air Force.

This invention relates to thermal barrier coating systems and, in particular, to a modified intermediate metallic coating structure between the substrate and the thermal barrier coating.

In an aircraft gas turbine (jet) engine, air is drawn into the front of the engine, compressed by a shaft-mounted compressor, and mixed with fuel. The mixture is burned, and the hot exhaust gases are passed through a turbine mounted on a shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of nickel-based superalloys, and can operate at temperatures of up to 1900°–2100° F.

Many approaches have been used to increase the operating temperature limit of the turbine blades and vanes. The composition and processing of the materials themselves have been improved. Physical cooling techniques are used. In one widely used approach, internal cooling channels are provided within the components, and cool air is forced through the channels during engine operation.

In another approach, a thermal barrier coating system is applied to the turbine blade or turbine vane component, which acts as a substrate. The thermal barrier coating system includes a ceramic thermal barrier coating that insulates the component from the hot exhaust gas, permitting the exhaust gas to be hotter than would otherwise be possible with the particular material and fabrication process of the component. Ceramic thermal barrier coatings usually do not adhere well directly to the superalloys used in the substrates. Therefore, an additional metallic layer called a bond coat is placed between the substrate and the thermal barrier coating. The bond coat is usually made of a nickel-containing overlay alloy, such as a NiCrAlY or a NiCoCrAlY, of a composition more resistant to environmental damage than the substrate. The bond coat may also be made of a diffusional nickel aluminide or a platinum aluminide, whose surface oxidizes to a protective aluminum oxide scale.

While superalloys coated with such thermal barrier coating systems do provide substantially improved performance over uncoated materials, there remains room for improvement. Improved environmental resistance to destructive oxidation and hot corrosion is desirable. In some instances, the alloying elements of the bond coat can interdiffuse with the substrate alloy to produce brittle intermetallic phases, and avoidance of such phases would be desirable.

There is an ongoing need for an improved procedure for manufacturing an improved article protected by a thermal barrier coating system, wherein the environmental resistance and long-term stability of the thermal barrier coating system is improved. The present invention fulfills this need, and further provides related advantages.

SUMMARY OF THE INVENTION

The present invention provides an improved article of a nickel-base or cobalt-base superalloy protected by a thermal barrier coating system. As compared with prior techniques, the approach of the present invention improves the resistance to environmental damage from oxidation and hot corrosion, reduces its susceptibility to the formation of brittle phases during extended term exposure and, in one form of the invention, reduces its weight.

In accordance with the invention, a coated article, such as a turbine vane or blade, has a base article having a substrate made of a nickel-base or cobalt-base alloy. A thermal barrier coating system overlies the substrate. The thermal barrier coating system is comprised of at least a protective coating and a ceramic thermal barrier coating. In one form of the invention, the protective coating, which is comprised of platinum, palladium or rhodium, directly overlies the substrate. This coating is preferably from about 0.0001 to about 0.001 inch thick, most preferably from about 0.0001 to about 0.0003 inch thick. The ceramic thermal barrier coating overlies the protective coating. This form of the invention minimizes the overall weight of the coating system.

The protective coating of platinum, palladium, or rhodium is deposited upon a surface using any appropriate procedure, such as plating, sputtering, vapor deposition, and the like. After it is applied, the coated substrate is heated to permit the material of the protective coating to diffuse into the bond coat and/or substrate, forming a layer that is rich in platinum, palladium, or rhodium and possibly includes the respective aluminide intermetallic compound if the bond coat and/or substrate has sufficient aluminum therein.

This approach has the advantage that no bond coat is used, reducing the weight of the coated article. Another positive effect of the absence of the bond coat is more subtle. A substrate typically may have rhenium as an alloying element to enhance the solid solution strengthening of the alloy. Rhenium has the undesirable side effect of contributing to the formation of a brittle secondary reaction zone near the interface between the substrate and the bond coat in some alloys, during long-term exposure at elevated temperatures. By eliminating the bond coat, the rhenium content of the substrate can be maintained or increased, while reducing the likelihood of the formation of a secondary reaction zone.

In an alternative form of the invention, the thermal barrier coating system also includes a metallic bond coat, which separates the protective coating from the substrate. The metallic bond coat is a nickel-base alloy of a composition different from that of the substrate, and which preferably forms an aluminum scale upon its surface in response to oxidation. This form of the invention provides superior resistance to oxidation.

The present invention provides an advance in the art of superalloy protection against high temperatures and adverse environmental effects. Other features and advantages of the invention will be apparent from the following more detailed description of the preferred embodiments, taken in conjunction with the accompa-

DETAILED DESCRIPTION OF THE PREFERRED EMBODIMENTS

Figure 1:
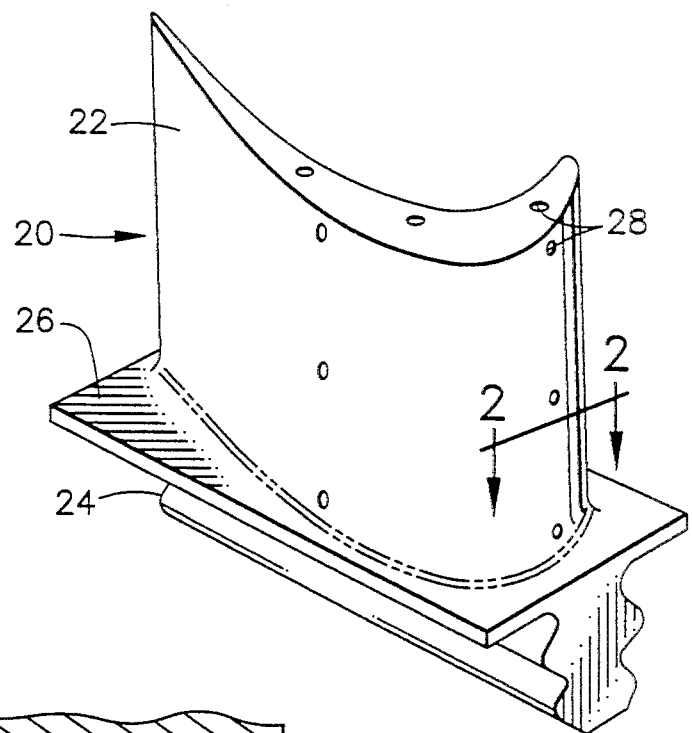
FIG. 1 is a perspective view of a gas turbine component.

FIG. 1 depicts a component of a gas turbine engine such as a turbine blade or turbine vane, and in this case is depicted as a turbine blade 20. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of cooling channels desirably extend through the interior of the airfoil 22, ending in openings 28 in the surface of the airfoil 22. A flow of cooling air is directed through the cooling channels, to reduce the temperature of the airfoil 22.

Figure 3:
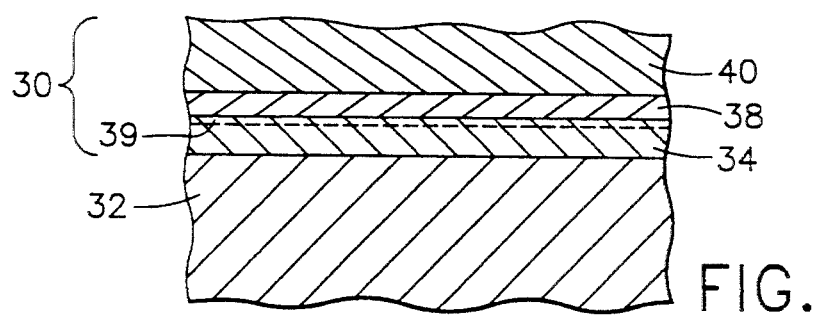
FIG. 3 is a sectional view through the component of FIG. 1 along line 2—2, showing a second embodiment of the invention.
Figure 4:
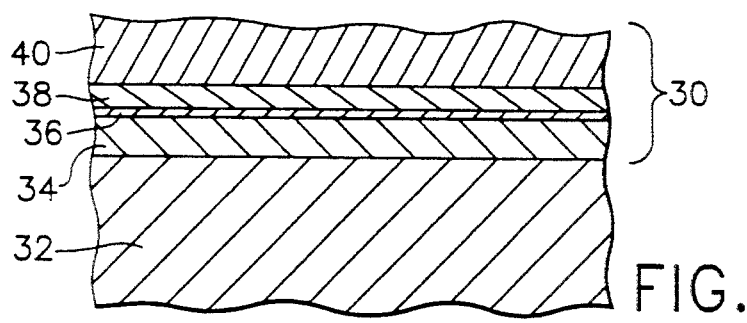
FIG. 4 is a schematic sectional view through the component of FIG. 1 along line 2—2, showing a third embodiment of the invention.
Figure 2:
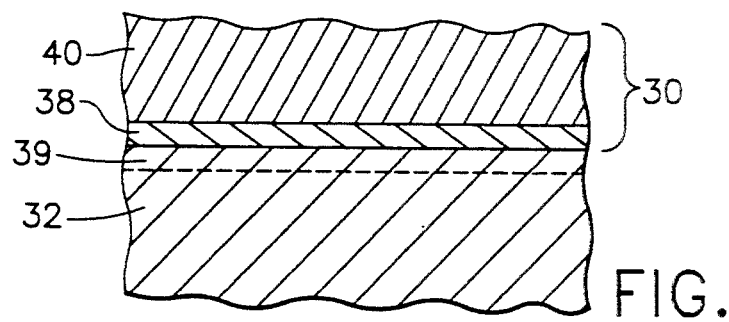
FIG. 2 is a sectional view through the component of FIG. 1 along line 2—2, showing one embodiment of the invention.

The airfoil 22 of the turbine blade 20 is protected by a thermal barrier coating system 30, illustrated in several embodiments in FIGS. 2-4. In each case, the thermal barrier coating system 30 is deposited upon the turbine blade 20, which becomes a substrate 32 for the thermal barrier coating system 30.

FIG. 2 depicts one embodiment of the substrate 32 and thermal barrier coating system 30. In this case, a protective layer 38 of platinum, palladium or rhodium is deposited directly upon the substrate 32. The protective layer is from about 0.0001 to about 0.001 inch thick, preferably from about 0.0001–0.0003 inch thick. The protective layer 38 may be deposited by any operable technique. Examples of such techniques include electroplating, sputtering and vapor deposition; this list is meant to be illustrative, and not limiting. The substrate article with the protective coating is then heat treated, typically at about 1800° to 2000° F. for about 1 to 4 hours, and preferably at about 1925° F. for about 2 hours, thereby forming an interdiffusion region 39. This region is about 0.0002–0.0004 inches thick. In this region, for example, platinum, palladium or rhodium atoms of the protective layer 38 interdiffuse with aluminum atoms of the substrate 32, thereby forming a platinum aluminide, a palladium aluminide or rhodium aluminide respectively in the interdiffusion region 39. The interdiffusion of atoms continues during service, and therefore the region 39 will continually broaden during service.

The thermal barrier coating 40 is then deposited upon the protective layer 38. The thermal barrier coating layer 40 is formed of a ceramic material that serves to insulate the substrate 32 from the temperature of the hot exhaust gas passing over the surface of the airfoil 22 when the engine is in service. The thermal barrier coating layer 40 may be any acceptable material, but desirably is yttria-stabilized zirconia, having a composition of from about 6 to about 20 weight percent yttrium oxide, and preferably about 8 percent yttrium oxide, balance zirconium oxide. The thermal barrier coating layer 40 is typically from about 0.003 to about 0.060 inches thick, and preferably about 0.005 inches thick, and is typically applied by air plasma spray, low pressure plasma spray or physical vapor deposition techniques. Such thermal barrier coatings and methods for the application thereof are known in the art.

Such ceramic thermal barrier coatings are sufficiently permeable to gas that oxygen from the operating environment may diffuse through such a coating and react with aluminum in the underlying metallic material to form a layer of aluminum oxide, which may be extremely thin. If the underlying metallic material is the substrate material with no intervening coating, the aluminum oxide layer does not adhere well to the substrate. Failure of the thermal barrier coating system may result from such lack of adhesion. However, if the underlying metallic material is the substrate material to which a protective coating had been previously applied, according to the method of the present invention, the aluminum oxide does adhere well to the protective coating, providing a significant improvement in performance of the thermal barrier coating system. Adhesion between the aluminum oxide layer and the ceramic thermal barrier coating is generally sufficient for satisfactory performance of a thermal barrier coating system, as is the adhesion between the protective coating of the present invention and the substrate.

In the embodiments illustrated in FIGS. 3 and 4, a bond coat layer 34 is deposited upon the substrate 32. The bond coat preferably has a thickness of from about 0.001 to about 0.015 inches, and more preferably 0.005 inches, and is formed of a nickel-base superalloy, or an MCrAlY where M is one or more of the elements Fe, Ni, or Co, or nickel aluminide alloy. Several applicable types of such materials are well known in the art of bond coats. A preferred bond coat material is a superalloy having a nominal composition, in weight percent, of 10.0 percent cobalt, 6.5 percent aluminum, 18.0 percent chromium, 6.0 percent tantalum, 2.0 percent rhenium, 1.0 percent silicon, 0.5 percent hafnium, 0.3 percent yttrium, 0.06 percent carbon, 0.015 percent boron, 0.015 percent zirconium, balance nickel.

During service, the aluminum in the bond coat layer 34 reacts with oxygen reaching its surface to form an adherent aluminum oxide scale. In the embodiment of FIG. 3, there is a negligibly thick aluminum oxide scale, which is not shown as a separate layer. In the embodiment of FIG. 4, an aluminum oxide layer 36 is present. This layer 36 may be formed by the interaction of aluminum from the substrate with the protective layer (38).

A protective layer 38 is deposited overlying the bond coat layer 34, or the aluminum oxide layer 36, where present.

After the protective layer 38 of Pt, Pd or Rh is deposited, the substrate is heat treated so that the material of the protective layer interacts with aluminum in the bond coat layer 34 to form an interdiffusion region 39 of platinum aluminide, palladium aluminide, or rhodium aluminide layer. In the embodiment of FIG. 2, there is no separate bond coat, but the aluminum from the substrate (32) interacts with the protective layer (38) to form the interdiffusion region 39). A thermal barrier coating layer 40 is then applied overlying the platinum aluminide (38 and 39).

The compositions, thicknesses, methods and other aspects of these coating layers are otherwise as described for the embodiment of FIG. 2.

The following examples are intended to illustrate aspects of the invention, and should not be taken as limiting to the invention in any respect.

EXAMPLE 1

The embodiment of FIG. 2 was evaluated by preparing three different sample groups. In the first, about 0.0002 inches of platinum was plated onto button specimens of a nickel-base superalloy having a nominal composition, in weight percent, of 12.5% Co, 4.5% Cr, 6.25% Al, 7% Ta, 5.75% W, 6.25% Re, 0.15% Hf, 0.05% C, 0.004% B, 0.3% Y, balance nickel and incidental impurities. The samples were then heat treated at a temperature of about 1925° F. for 2 hours. In a second group, a 0.0017 inch thick nickel aluminide bond coat was applied to button specimens of the same alloy by a commercial vapor aluminide process available from Chromalloy Gas Turbine Corporation. This type of bond coat is well known to those skilled in the art of thermal barrier coating systems. The samples were heat treated at a temperature of about 1925° F. for 2 hours. A third group was similar to the second group, except that the bond coat thickness was 0.0025 inch thick. The samples were heat treated at a temperature of about 1925° F. for 2 hours.

All samples were coated with a thermal barrier coating of zirconia having about 8 percent yttria therein by electron beam physical vapor deposition.

The samples were tested by a thermal cycling procedure to determine the durability of the thermal barrier coating. In that procedure, the samples were heated to a temperature of 2075° F. in a time of about 9 minutes, held at temperature for 45 minutes, and then cooled to below about 200° F. within 10 minutes. This constituted one cycle. The cycled samples were examined every 20 cycles. Failure was defined as the number of cycles required for more than 10 percent of the thermal barrier coating to be lost by spalling.

The three samples of the first group, having the platinum coating, survived 180, 150, and 120 cycles to failure, respectively. The three samples of the second group, having the 0.0017 inch aluminide bond coat, survived 80, 80, and 80 cycles, respectively. The three samples of the third group, having the 0.0025 inch aluminide bond coat, survived 20, 20, and 40 cycles, respectively.

The platinum-coated samples had substantially greater lives in this accelerated cycling test than did the samples coated with conventional bond coat material.

This invention has been described in connection with specific embodiments and examples. However, it will be readily recognized by those skilled in the art the various modifications and variations of which the present invention is capable without departing from its scope as represented by the appended claims.

What is claimed is:

1. A coated article, comprising:
   a base article having a substrate made of a material selected from the group consisting of nickel-base alloys and a cobalt-base alloys;
   a metallic bond coat selected from the group consisting of nickel-based alloy, MCrAlY and nickel aluminide alloy overlying the substrate, wherein said metallic bond coat is distinguished from said substrate and further wherein M is at least one metal selected from the Group consisting of Fe, Ni and Co;
   a protective coating overlying the bond coat, the protective coating made of a material selected from the group consisting of platinum, palladium, and rhodium, and alloy combinations thereof; and
   a ceramic thermal barrier coating overlying the protective coating.

2. The coated article of claim 1, wherein the metallic bond coat is a nickel aluminide.

3. The coated article of claim 2 wherein the metallic bond coat has an oxidized surface.

4. The coated article of claim 1, wherein the protective coating has at least partially interdiffused with the bond coat.

5. The coated article of claim 1, wherein the protective coating is from about 0.0001 to about 0.001 inches thick.

6. The coated article of claim 1, wherein the protective coating is from about 0.0001 to about 0.0003 inches thick.

7. The coated article of claim 1, wherein the base article has the shape of a turbine vane.

8. The coated article of claim 2, wherein the base article has the shape of a turbine blade.

9. The coated article of claim 2, wherein the protective coating is platinum.

* * * * *